(12) United States Patent
Harris et al.

(10) Patent No.: US 11,134,208 B1
(45) Date of Patent: Sep. 28, 2021

(54) INCREASING DYNAMIC RANGE OF DIGITAL PIXELS BY UTILIZING POLLING DURING INTEGRATION

(71) Applicant: Raytheon Company, Waltham, MA (US)

(72) Inventors: Micky Harris, Lompoc, CA (US); Roya Mokhtari, Santa Barbara, CA (US); Juliette Costa, Santa Barbara, CA (US); Joseph Costa, Santa Barbara, CA (US); Eric Beuville, Goleta, CA (US); John Devitt, Solvang, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/950,488

(22) Filed: Nov. 17, 2020

(51) Int. Cl.
*H04N 5/3745* (2011.01)
*H04N 5/355* (2011.01)
*H04N 5/374* (2011.01)
*H04N 5/347* (2011.01)

(52) U.S. Cl.
CPC ............ *H04N 5/355* (2013.01); *H04N 5/347* (2013.01); *H04N 5/3742* (2013.01); *H04N 5/37455* (2013.01)

(58) Field of Classification Search
CPC .... H04N 5/355; H04N 5/347; H04N 5/37455; H04N 5/3742
See application file for complete search history.

(56) References Cited

U.S. PATENT DOCUMENTS

| 9,036,065 | B1* | 5/2015 | Vogelsang | ......... H04N 5/35536 348/308 |
| 9,154,713 | B2 | 10/2015 | Denham | |
| 9,674,471 | B1 | 6/2017 | Boemler | |
| 9,768,785 | B2 | 9/2017 | Schultz | |
| 2012/0081580 | A1* | 4/2012 | Cote | ...................... H04N 5/335 348/231.99 |
| 2013/0278804 | A1* | 10/2013 | Denham | ................ H04N 5/347 348/302 |
| 2014/0034809 | A1* | 2/2014 | Shen | .................... H04N 5/3355 250/208.1 |
| 2015/0116564 | A1* | 4/2015 | Williams | ............. H04N 5/3742 348/308 |

* cited by examiner

*Primary Examiner* — Mekonnen D Dagnew
(74) *Attorney, Agent, or Firm* — Renner, Otto, Boisselle & Sklar, LLP

(57) ABSTRACT

Digital circuitry is provided that periodically reads at least one bit of digital counters associated with pixels of an image sensor. When the read bit(s) of a particular digital counter decrease between subsequent reads, then the digital circuitry increments an overflow counter associated with the particular digital counter. The value of each of the overflow counters of the digital circuitry are used with the corresponding values of the digital counters to generate pixel values for a frame (also referred to as an image).

20 Claims, 5 Drawing Sheets

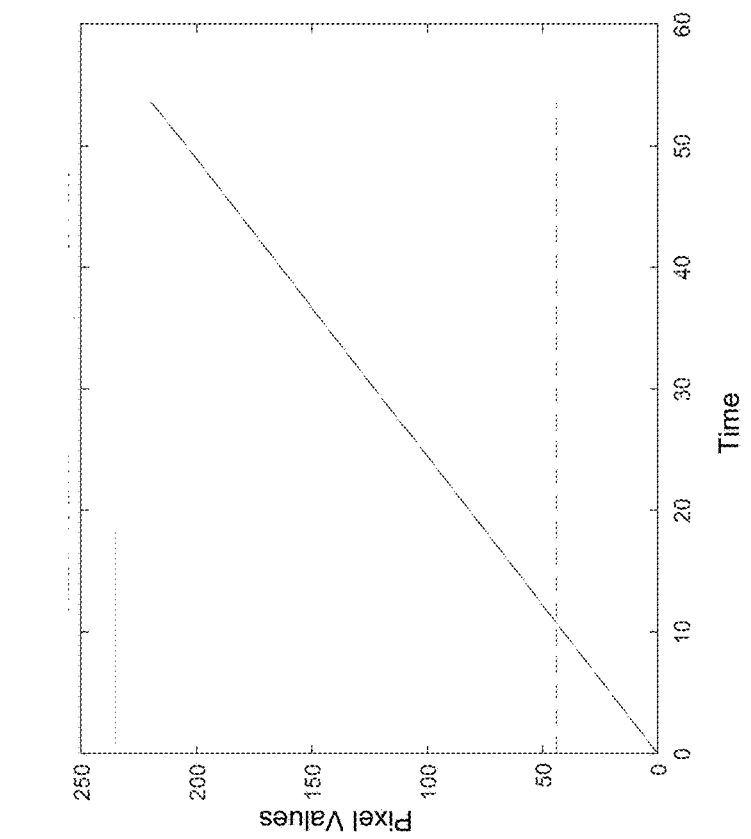
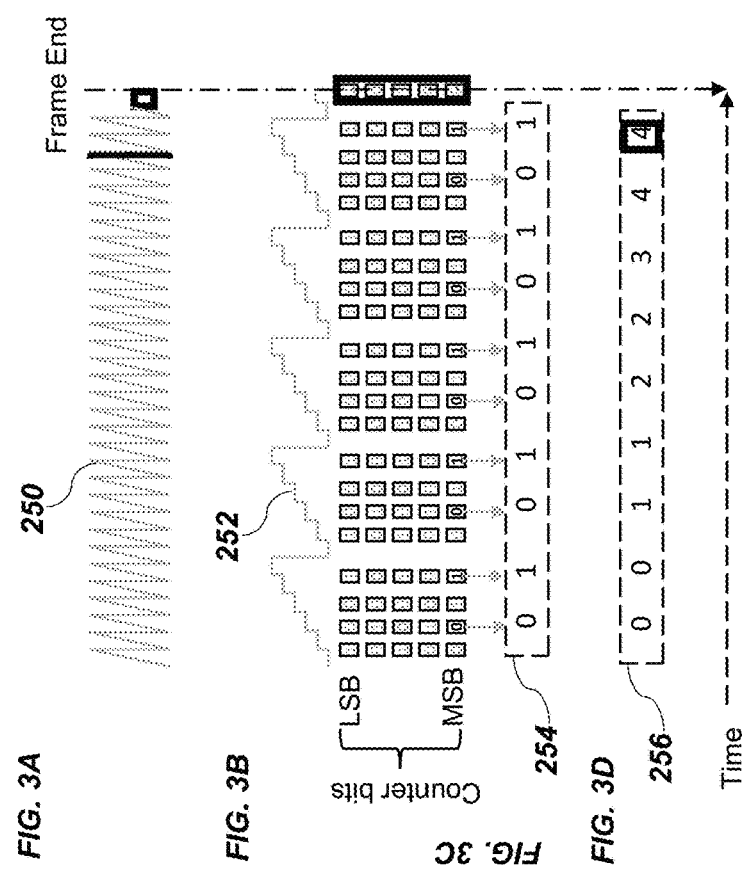
FIG. 3A
FIG. 3B
FIG. 3C
FIG. 3D
FIG. 4

INCREASING DYNAMIC RANGE OF DIGITAL PIXELS BY UTILIZING POLLING DURING INTEGRATION

FIELD OF INVENTION

The present disclosure relates generally to digital image sensors and more particularly to improving the dynamic range of digital image sensors.

BACKGROUND

Modern digital image sensors often include an integrate-then-read mode in which the sensor is triggered during an idle state. When operated in an integrate then read mode, an image sensor does not utilize the output bandwidth fully and the output bandwidth often sits idle.

Digital image sensors are susceptible to saturation and noise if not polled (i.e. read out or reset) frequently enough. For example, pixels often include digital counters to track an intensity of light received by the pixel. The digital counters include N-bits and may roll over (i.e., reset to a lower value) if the amount of light received by the pixel exceeds the capacity of the digital counter. This causes uncertainty in the resulting image.

SUMMARY

In a general embodiment, the present disclosure provides a system and method for more fully utilizing the bandwidth of a digital image sensor by periodically reading a status of pixel's digital counters to be stored either on-chip or off-chip to extend the dynamic range of the pixels.

In one embodiment, digital circuitry periodically reads at least one bit of digital counters associated with pixels of an image sensor. When the read bit(s) of a particular digital counter decreases between subsequent reads, then the digital circuitry increments an overflow counter associated with the particular digital counter. At the end of each frame, the value of each of the overflow counters of the digital circuitry are used with the corresponding values of the digital counters to generate pixel values for a frame (also referred to as an image).

Aspects and embodiments of this disclosure are generally directed to Read-Out Integrated Circuits (ROICs) of focal plane arrays (FPAs) including a two-dimensional array of pixels (also referred to as (detector elements). Unlike conventional ROICs, the imaging system described herein includes digital circuitry to interface with digital counters of the ROIC. Instead of including higher bit digital counters, the digital circuitry allows for the dynamic range of the pixels to be extended by keeping track of when the digital counter rolls over (i.e., extends beyond the limited bits of the digital counter).

According to one embodiment, there is provided a method performed using digital circuitry for increasing a dynamic range of a video frame. The method includes storing an overflow counter associated with each of a plurality of digital counters of an imaging system. Each of the digital counters is associated with and in communication with a respective one of pixels of the imaging system, and each of the digital counters is configured to store a digital counter value based on a signal received from the respective one of the pixels. For each of the plurality of digital counters: the method periodically reads at least one bit of the digital counter value over multiple iterations, compares the at least one bit of the digital counter value from one iteration of the multiple iterations to a previous iteration of the multiple iterations, and, when a value represented by the at least one bit of the digital counter value has decreased from the previous iteration to the one iteration, incrementing an associated overflow counter of the digital circuitry. The method also converts and outputs the digital counter value from at least one of the plurality of digital counters and the associated overflow counter as at least one pixel value of the video frame.

Alternatively or additionally, the at least one bit is less than all bits of the digital counter value.

Alternatively or additionally, the at least one bit is only a most significant bit of the digital counter value.

Alternatively or additionally, the method also includes, for each of the plurality of pixels, storing an electrical charge generated by the pixel in one of a plurality of electrical storage devices associated with the respective pixel. The method periodically determines whether a cumulative electrical charge in the respective electrical storage device exceeds a predetermined threshold value. In response to determining that the cumulative electrical charge stored in the respective electrical storage device exceeds the predetermined threshold value, the method reduces the electrical charge stored in the respective electrical storage device by a predetermined charge reduction amount and incrementing one of a plurality of digital counter values stored in the digital counters and associated with the respective pixel.

Alternatively or additionally, each of the pixels further comprises a photodetector configured to generate the electrical charge in response to light impinging thereon. Based on an intensity of the light impinging upon the photodetector of at least one of the pixels, the method determines a duration of time of the period at which the digital circuitry reads at least one bit of the digital counter value over multiple iterations.

Alternatively or additionally, the duration of time of the period is determined based on the intensity of the light impinging upon the photodetector of a pixel that is receiving a highest intensity of among light of the pixels.

Alternatively or additionally, the method periodically converts for each of the plurality of pixels a residual electrical charge in the respective electrical storage device of each of the plurality of pixels into an analog signal. The method also converts the analog signal from each pixel into a respective digital binary value using one of a plurality of analog-to-digital converters, each of the plurality of analog-to-digital converters having an input and an output, and each of the plurality of analog-to-digital converters being coupled via its input to the respective electrical storage device of a corresponding one of the plurality of pixels. The respective digital binary value is additionally used in the conversion of the at least one of the plurality of digital counters and the associated overflow counter into the at least one pixel value of the video frame.

According to another embodiment, there is provided digital circuitry for increasing a dynamic range of a video frame. The digital circuitry stores an overflow counter associated with each of a plurality of digital counters of an imaging system. Each of the digital counters is associated with and in communication with a respective one of pixels of the imaging system, and each of the digital counters is configured to store a digital counter value based on a signal received from the respective one of the pixels. For each of the plurality of digital counters: the circuitry periodically reads at least one bit of the digital counter value over multiple iterations; compares the at least one bit of the digital counter value from one iteration of the multiple iterations to a previous iteration of the multiple iterations; and, when a value represented by the at least one bit of the digital counter value has decreased from the previous iteration to the one iteration, increments an associated overflow counter.

Alternatively or additionally, the at least one bit is less than all bits of the digital counter value.

Alternatively or additionally, the at least one bit is only a most significant bit of the digital counter value.

Alternatively or additionally, each of the pixels further comprises a photodetector configured to generate the electrical charge in response to light impinging thereon. A duration of time of the period at which the digital circuitry reads at least one bit of the digital counter value over multiple iterations is determined based on an intensity of the light impinging upon the photodetector of at least one of the pixels.

Alternatively or additionally, the duration of time of the period is determined based on the intensity of the light impinging upon the photodetector of a pixel that is receiving a highest intensity of the light among the pixels.

According to another embodiment, there is provided an imaging system including an array of pixels, a plurality of digital counters, and digital circuitry. Each of the pixels includes an electrical storage device configured to accumulate an electrical charge from photo-current, and quantization circuitry coupled to the electrical storage device and configured to convert the electrical charge into an analog quantization event signal. The plurality of digital counters corresponding to the array of pixels, each of the digital counters being associated with and in communication with a respective one of the pixels, and each of the digital counters is configured to store a digital counter value in response to receiving the analog quantization event signal from the respective one of the pixel. The digital circuitry stores an overflow counter associated with each of the plurality of digital counters. For each of the plurality of digital counters, the digital circuitry: periodically reads at least one bit of the digital counter value over multiple iterations; compares the at least one bit of the digital counter value from one iteration of the multiple iterations to a previous iteration of the multiple iterations; and, when a value represented by the at least one bit of the digital counter value has decreased from the previous iteration to the one iteration, increments an associated overflow counter.

Alternatively or additionally, the at least one bit is less than all bits of the digital counter value.

Alternatively or additionally, the at least one bit is only a most significant bit of the digital counter value.

Alternatively or additionally, each of the pixels further comprises a photodetector configured to generate the photo-current in response to light impinging thereon. A duration of time of the period at which the digital circuitry reads at least one bit of the digital counter value over multiple iterations is determined based on an intensity of the light impinging upon the photodetector of at least one of the pixels.

Alternatively or additionally, the duration of time of the period is determined based on the intensity of the light impinging upon the photodetector of a pixel that is receiving a highest intensity of the light among the pixels.

Alternatively or additionally, the system additionally includes a digital formatter configured to convert the digital counter value from at least one of the plurality of digital counters and the associated overflow counter into at least one pixel value of a video frame.

Alternatively or additionally, the system also includes a plurality of analog-to-digital converters, each of the plurality of analog-to-digital converters having an input and an output. Each of the plurality of analog-to-digital converters is coupled via its input to the electrical storage device of at least one of the pixels and configured to convert a residual electrical charge in the respective electrical storage device into a digital binary value. The digital formatter additionally utilizes the digital binary value from at least one of the plurality of analog-to-digital converters in the conversion of the digital counter value from the at least one of the plurality of digital counters and the associated overflow counter into the at least one pixel value of the video frame.

Alternatively or additionally, each of the pixels further comprises a photodetector configured to generate the photo-current in response to light impinging thereon. The digital counter value corresponds to an intensity of the light impinging upon the photodetector of the respective one of the pixels.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages, and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

FIG. 3A depicts residual charge stored by the capacitor of the imaging system.

FIG. 3B depicts a digital counter value of an associated digital counter of the imaging system.

FIG. 3C depicts counter bits of the imaging system that represent the digital counter value.

FIG. 3D depicts an overflow counter value of the imaging system.

FIG. 4 is a plot of pixel value vs time for standard pixels, and for pixels in the imaging system of FIG. 1.

Figure 1:
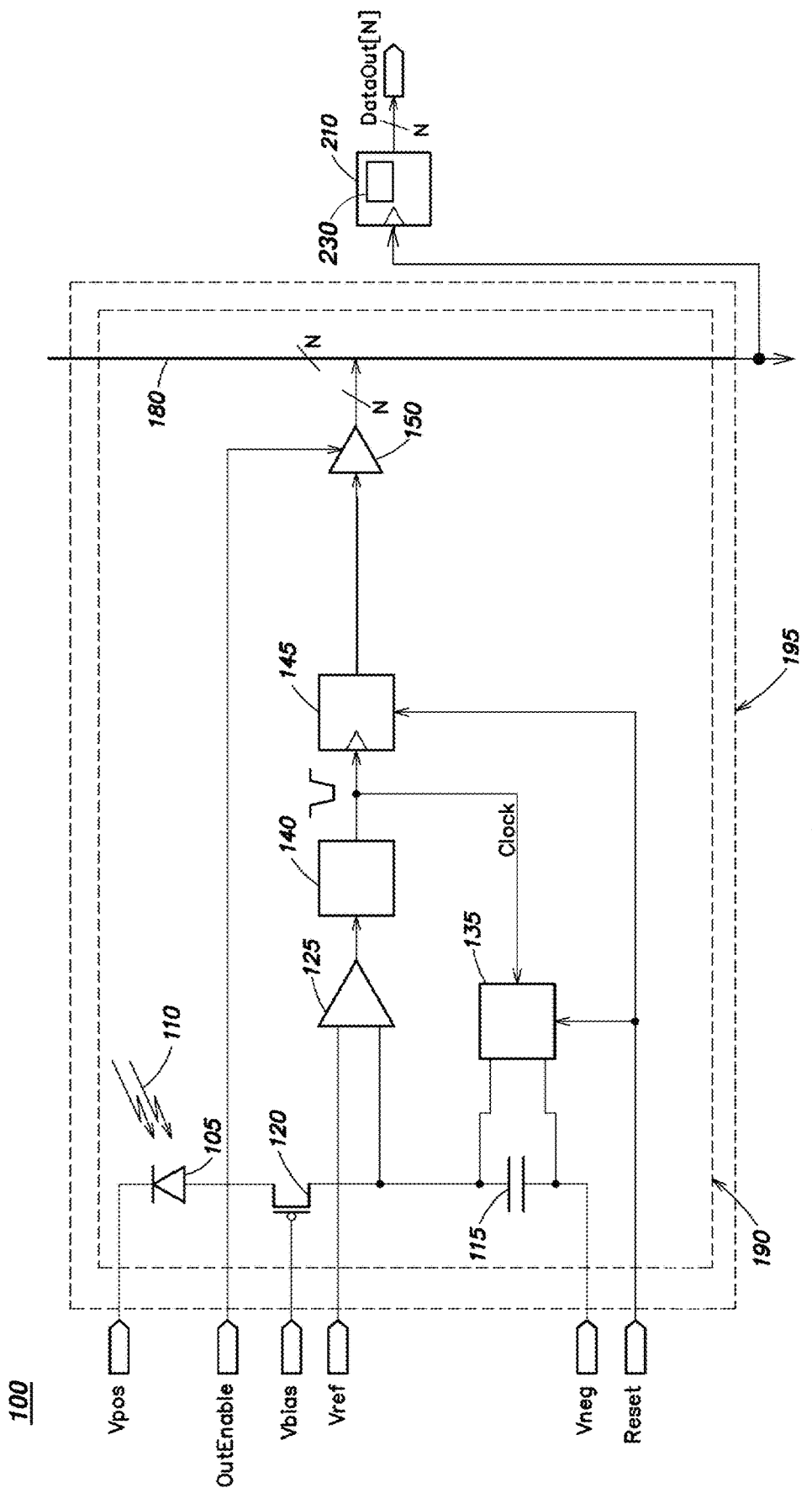
FIG. 1 is a block diagram of an imaging system.

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

Turning to FIG. 1, a general embodiment of an imaging system 100 is shown including a photodetector 105, incident light 110, a capacitor 115, biasing circuitry 120, a comparator 125, a charge removal circuit 135, a plurality of digital counters 145, a tri-state gate 150, a data out line 180, a plurality of pixels 190 (also referred to as detector elements or pixel cells) in an array 195, and digital circuitry 210. Each of the digital counters 145 is associated with and in communication with a respective one of the pixels 190. Each digital counter 145 increments and stores a digital counter value. Each of the pixels 190 includes quantization circuitry coupled to the capacitor 115 (also referred to as an electrical storage device) and is configured to convert the electrical charge into an analog quantization event signal. Each digital counter 145 stores a digital counter value in response to receiving the analog quantization event signal from the pixel associated with the digital counter 145.

The digital circuitry 210 stores an overflow counter associated with each of the plurality of digital counters in memory 230 (e.g., non-transitory computer readable medium). In particular, the digital circuitry 210 periodically reads at least one bit of the values for each of the digital counters 145 over multiple iterations. The digital circuitry 210 compares the bit(s) of the digital counter value from one iteration to a previous iteration. When a value of the bit(s) of a particular digital counter 145 decreases from a previous iteration to the current iteration, the digital circuitry 210 increments the associated overflow counter.

In one embodiment, the digital circuitry 210 only reads a portion of all the bits of each of the digital counters. That is, the value for each digital counter 145 may be a digital binary value (i.e., a value represented by a plurality of bits) and the digital circuitry 210 may only read a few of the bits representing the digital counter value for each of the digital counter 145. For example, the digital circuitry 210 may only read the most significant bit of each of the digital counters 145. By only reading out a portion of the bits representing each of the digital counter values, the digital counter values may be read more frequently (i.e., at an increased frequency) by the digital circuitry, reducing the chance that aliasing will occur (as is described in greater detail below).

Each of the pixels 190 includes an electrical storage device for accumulating an electrical charge from a photo-current. In one embodiment, the pixel 190 includes a photodetector (also referred to as a photodiode) 105 that generates the photo-current based on a flux of light 110 received by the photodetector 105. The charge is accumulated on the capacitor 115 (also referred to as a capacitive element) that effectively integrates charge over an integration time interval to produce a voltage corresponding to the intensity of the flux of light 110. The photodetector 105 may be coupled to the capacitor 115 via the biasing circuitry 120 (such as a MOS transistor or direct injection gate) that is biased with a voltage $V_{bias}$.

The charge removal circuit 135 includes circuitry capable of resetting the voltage of capacitor 115 back to an initial condition, as well as circuitry capable of conveying a charge or voltage to a data out line 180 (also referred to as a column or row wire) for transfer to an output of array 195. As described below, such a voltage or charge can be digitized by circuitry associated with the focal plane array 195 resulting in binary values (e.g., at least one value for each pixel 190 of the focal plane array 195). Thus a focal plane array 195 can be used to convert a two-dimensional pattern of light flux into a two-dimensional array of binary values. Such a resulting array is often called a digital image or frame.

The array 195 may be arranged as a two-dimensional (2D) array organized by columns and rows. The array 195 of digital pixels 190 may be embodied as read-out integrated circuits (ROICs) of focal plane arrays (FPAs). When the array 195 is embodied as an ROIC, the digital circuitry 210 may be located separate from the ROIC to reduce cost and complexity of the ROIC. For example, the digital circuitry 210 may be embodied as a field programmable gate array (FPGA) or ASCIIS that is communicatively coupled to the ROIC. The digital circuitry 210 being a separate digital structure may improve area efficiency and cost and better utilizes the output bandwidth. Using a separate structure for the digital circuitry 210 (e.g., an FPGA) also allows for existing (e.g., off the shelf) ROIC to be used.

The digital circuitry 210 may include any suitable device, such as a processor (e.g., CPU), programmable circuit, integrated circuit, memory and I/O circuits, an application specific integrated circuit, microcontroller, complex programmable logic device, other programmable circuits, or the like. The digital circuitry 210 may also include a non-transitory computer readable medium, such as random-access memory (RAM), a read-only memory (ROM), an erasable programmable read-only memory (EPROM or Flash memory), or any other suitable medium.

In one embodiment, the digital circuitry 210 utilizes commercial-off-the-shelf (COTS) memory for implementation. The power requirements of the digital circuitry 210 may be negated by existing serialization links of the array 195 that are present when the array 195 is embodied as an ROIC. Additionally, in an integrate while read system, the bandwidth of the ROIC is typically available to be used by the digital circuitry 210, because the bandwidth is not used when data (such as a frame or image) is not being transmitted.

When the array 195 is embodied as an ROIC, the ROIC can be optimized for polling by having multiple rows active on the existing bus by staggering the row connection to the bus. This technique may relax the timing requirements for reading the most significant bit of the pixel array, allowing for higher polling speeds.

As shown in the embodiment depicted in FIG. 1, the digital circuitry 210 may be a separate physical structure from the array 195. For example, the digital circuitry 210 may be implemented using a FPGA including digital memory 230 for storing at least one digital counter value and the overflow counter. The digital circuitry 210 may, e.g., have the same logical organization as the array 195 (e.g., 1920 by 1080 storage elements), or different logical organization.

In an integrate-while-read architecture, the digital circuitry 210 may include two sets of memory locations for each pixel 190, a first location to store the current overflow counter value 256 associated with the pixel 190 and a second location to store the previous overflow counter value 256 associated with the pixel 190.

As is described in further detail below, the effective amount of charge that is accumulated by the pixels 190 over an integration interval is increased by the addition of a digital counter 145 (also referred to as a digital counter circuit). In some embodiments each pixel 190 is given a unique digital counter 145 (referred to as an associated digital counter). As described, circuitry included in each pixel allows for a predetermined amount of charge to be removed from the capacitor 115 of each pixel 190 and for correspondingly increasing the value of the associated digital counter by one count. Thus over the lapsed period of time of an integration interval: (1) the capacitor 115 of the pixel 190 integrates photo-charge, (2) a circuit within the pixel 190 removes predetermined quantities of charge, and (3) a digital counter 145 associated with the pixel 190 counts the number of charge removals. In this manner the effective amount of charge that is accumulated by the pixel 190 over an integration interval can be increased because the associated digital counter 145 effectively extends the capacity of the capacitor 115.

The digital counters 145 may be included in a plurality of digital memory elements coupled to the array 195 of pixels 190. The type of digital counters 145 used to record charge removals can be of any logical variation, including binary, gray code, Linear-Feedback-Shift-Register (LFSR), or any other digital count circuit that can count charge removals. Furthermore the relative sign of the charge removal can be plus or minus, relative to circuit ground, so a charge removal could be viewed as a charge addition in some cases.

Figure 2:
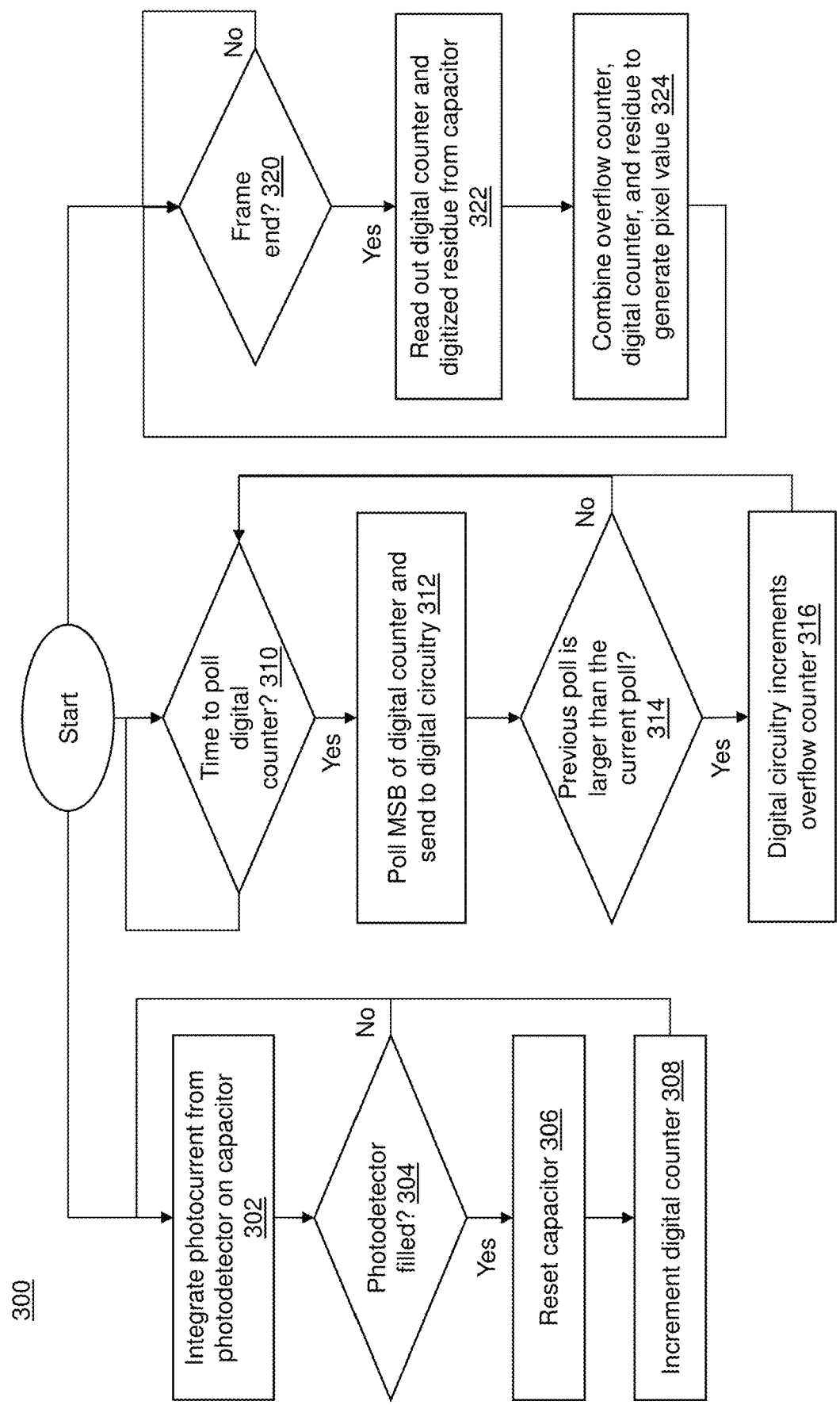
FIG. 2 is a block diagram of a method for generating a pixel value using the imaging system.

Turning to FIG. 2, a flow chart of a method 300 for generating a value for a pixel 190 in a frame is shown. In process block 302, photocurrent from the photodetector 105 is integrated on the capacitor 115. In decision block 304, a continuous check is performed to determine if the capacitor 115 has reached its capacity for charge storage. If the capacitor 115 has not reached its capacity, then processing returns to process block 302 and the capacitor 115 continues to integrate charge. If the capacitor 115 has reached its capacity, then processing moves to process block 306. In process block 306, the capacitor 115 is reset to enable storage of additional charge. In process block 308, the associated digital counter 145 (i.e., the digital counter 145 associated with the pixel 190) is incremented and processing returns to process block 302.

In decision block 310, a check is performed to see if it is time to poll the associated digital counter 145. For example, the digital counter 145 associated with the pixel 190 may be polled at a given frequency and a clock may be checked to determine if enough time has passed since the last polling, such that it is time to perform an additional polling. If it is not time to poll the digital counter 145, then processing returns to decision block 310 until it is time to poll the associated digital counter 145. When it is time to poll the associated digital counter 145, then processing moves to process block 312. In process block 312 of the embodiment depicted in FIG. 2, the MSB (or some number of bits less than all the bits) of the associated digital counter 145 is polled and sent to the digital circuitry 210.

In decision block 314, a check is performed to determine if the previously polled MSB of the associated digital counter 145 is larger than the most recently polled MSB of the associated digital counter 145. If not, then processing returns to decision block 310. If yes, then processing moves to process block 316. In process block 316, the digital circuitry 210 increments an overflow counter 316 associated with the pixel 190.

In decision block 320, a check is performed to determine if a time has been reached for capturing a frame (also referred to as an image). For example, frames may be captured at a particular frequency or an image capture instruction may be generated based on an exposure setting. If yes, then processing moves to process step 322. In process step 322, the value of the associated digital counter 145 and the digitized residue from the capacitor 115 of the pixel 190 are read out. In process step 324, the value of the associated digital counter 145, the value of the digitized residue of the capacitor 115, and the value of the overflow counter are combined to generate the value of the pixel 190. By performing this process for all the pixels 190 in the array 195, a frame having an improved dynamic range is generated.

Turning to FIGS. 3A-3D, an exemplary relationship between the values of the capacitor 115, the associated digital counter 145, and the overflow counter are shown vs time. In the depicted example, the photocurrent on the photodetector 105 is integrated and stored in the capacitor 115. The charge (also referred to as the residue) 250 stored by the capacitor 115 resets when filled, such that the residue 250 appears as a sawtooth plot in FIG. 3A. When the residue 250 is reset (represented by the residue 250 decreasing from a maximum value to a minimum value in FIG. 3A), the digital counter value 252 of the associated digital counter 145 is incremented.

The incrementing of the digital counter value 252 is represented by the stair step pattern and the counter bits in FIG. 3B. In FIG. 3B the digital counter value 252 is represented by four counter bits including a least significant bit (LSB) and an MSB 254. While the digital counter value 252 is represented by four bits in FIG. 3C, this is only an example and the digital counter value 252 may be represented by any number of bits.

When the digital counter value 252 exceeds the maximum value represented by the counter bits, the digital counter value 252 will roll over and reset to the minimum value. For example, when using four bits, the maximum value is fifteen and the minimum value is zero. When the digital counter value 252 increments from 15, the digital counter value 252 resets to zero instead of reaching sixteen. This is represented by the stair step pattern in FIG. 3C transitioning from a maximum value to a minimum value. When this roll over of the digital counter value 254 occurs, the overflow counter value 256 is incremented as shown in FIG. 3D. Roll over of the digital counter value 252 may be detected by periodically polling the MSB 254 of the digital counter value 252. When the MSB 254 decreases between polls, this may be used as an indicator that the MSB 254 has rolled over.

In FIGS. 3A-3D, when the frame end occurs (represented by the dash-dot line) and a frame is to be generated, the digital counter value 256 and the residue 250 from the photodetector 105 are read out and combined with the overflow counter value 256 to determine a value of the pixel 190. For example, the pixel value may be defined as follows:

$$\text{Pix}_{Val} = \text{Overflow}_{Val} \times (2^{num\_bits} - 1) + \text{DigCounter}_{Val} + \text{Res}/\text{Mag}_{Res},$$

where $\text{Pix}_{Val}$ is the pixel value, $\text{Overflow}_{Val}$ is the overflow value 256, $\text{DigCounter}_{Val}$ is the digital counter value 252, num_bits is the number of bits of the digital counter value 254, Res is the residue 250, and $\text{Mag}_{Res}$ is the maximum value of the residue before the residue is reset.

In one embodiment, the imaging system 100 may additionally include a digital formatter for converting the digital counter value 252 from at least one of the plurality of digital counters 145 and the associated overflow counter into at least one pixel 190 of a frame. The digital formatter may be an off-chip computer hardware (i.e., separate from) or on-chip (i.e., included) as part of the digital circuitry 210.

The frequency at which the digital circuitry 210 reads and/or stores the bit(s) of each of the digital counter values 252 may be determined based on an intensity of the light 110 impinging upon the photodetector 105 of at least one of the pixels 190. For example, when at least one of the pixels 190 is receiving bright light, the read frequency at which the digital circuitry 210 reads the bit(s) of the digital counter values 252 may be increased to avoid aliasing. Aliasing occurs when the read frequency is not fast enough to account for a change in the bit(s) of the digital counters. For example, in FIG. 3C aliasing would occur if the MSB 254 of the digital counter 145 switched from "0" to "1" and back to "0" between polls by the digital circuitry 210. That is, aliasing would occur if the digital circuitry 210 missed a flipping of the MSB 254 of one of the digital counters 145 from "0" to "1" and back to "0" and instead only saw "0" and "0" when polling.

Figure 6:
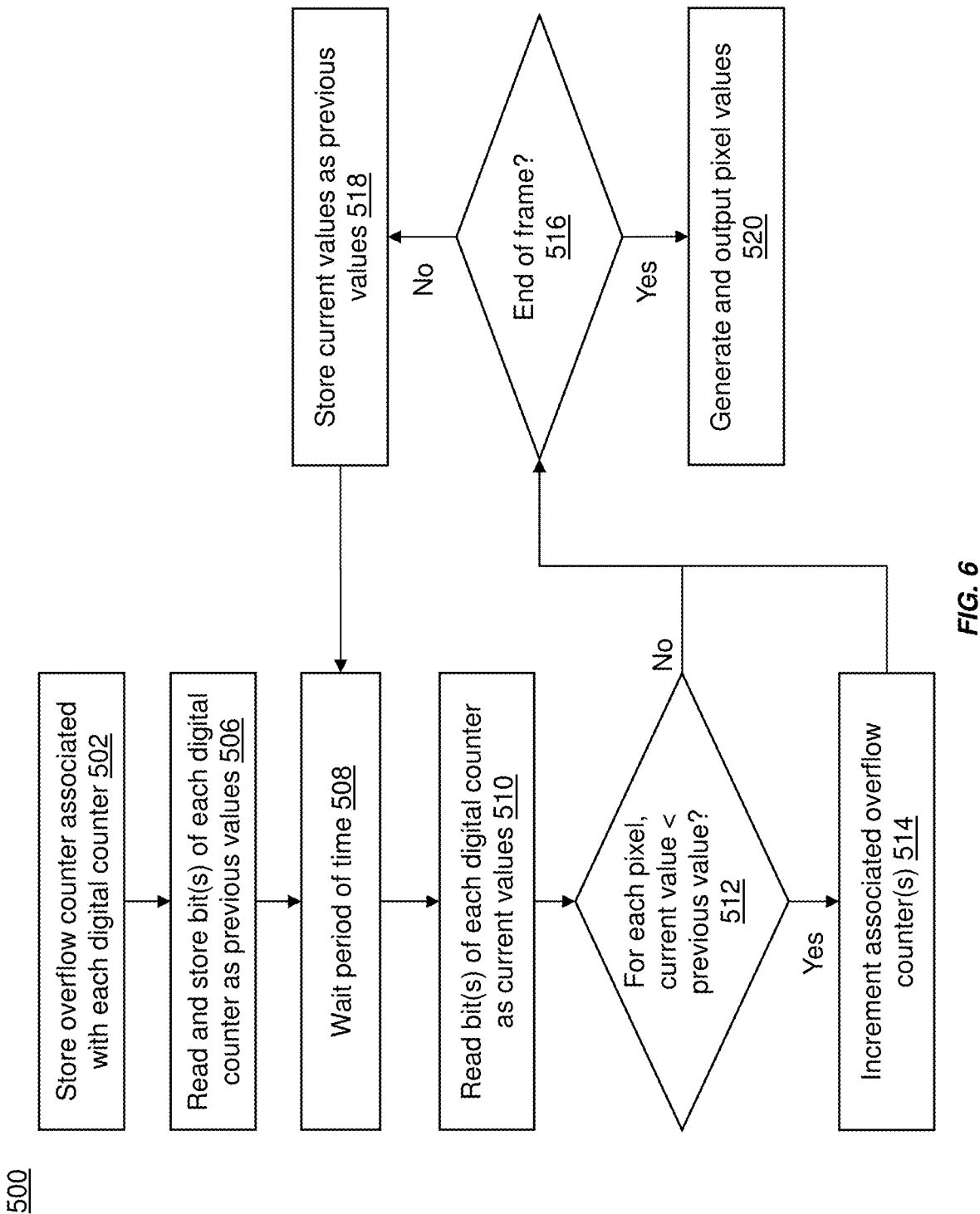
FIG. 6 is a block diagram of a method for increasing a dynamic range of a frame.

Turning to FIG. 4, a plot of the pixel value 258 vs time of a pixel 190 is shown. The dashed line represents the maximum pixel value 258 for a pixel 190 without using the digital circuitry 210. For such a pixel 190, the maximum pixel value 258 is capped out by the capacity of the pixel 190 and/or the number of bits of the digital counter 145. The solid line in FIG. 6 shows the pixel value for a pixel 190 including a digital counter 145 and using digital circuitry 210 to maintain an overflow counter as described above. As shown, the pixel value 258 represented by the solid line is not limited in the same manner the pixel value 258 represented by the dashed line. Instead, the pixel value 258 represented by the dashed line continues to increase with time.

Figure 5:
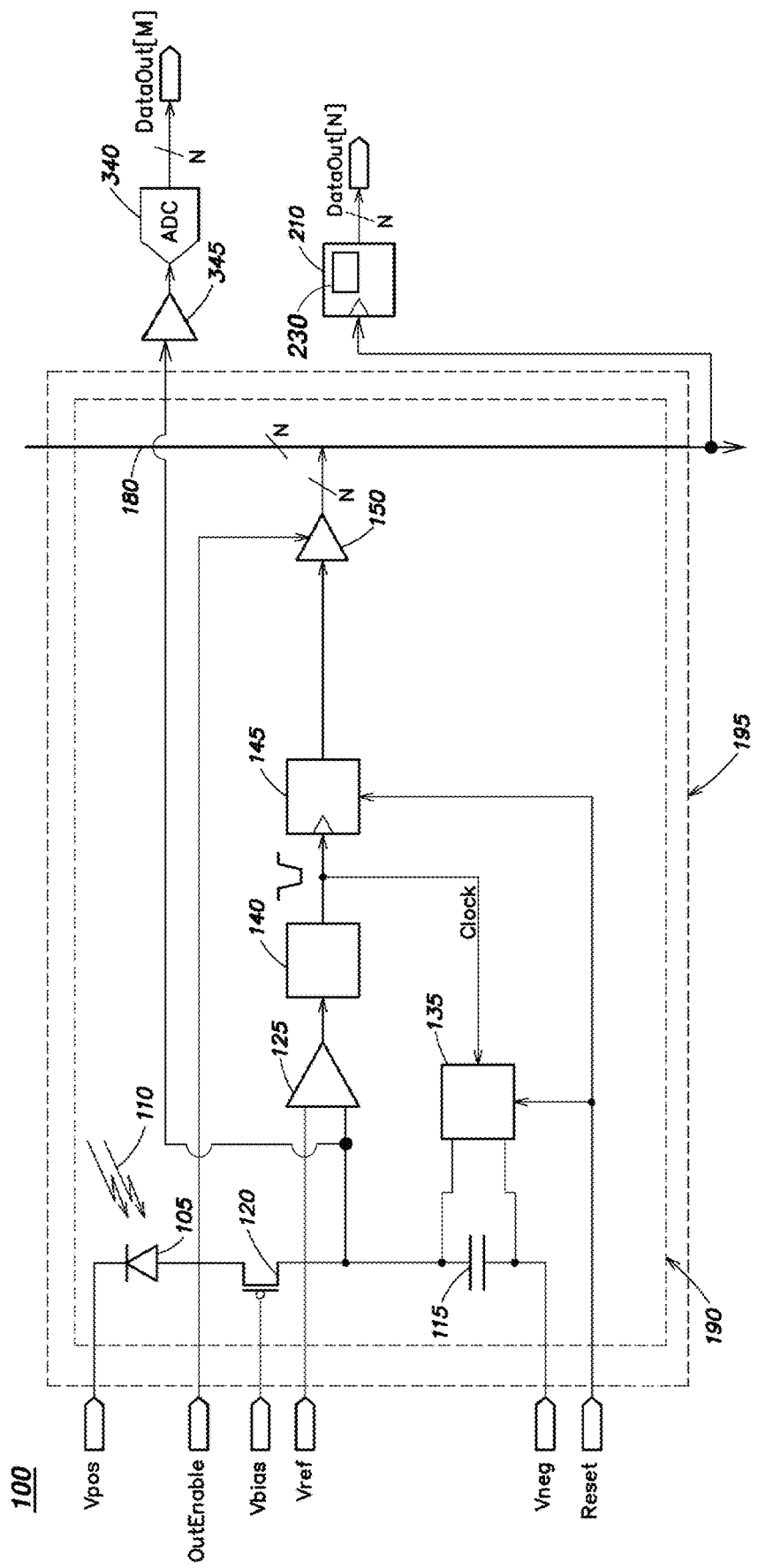
FIG. 5 is a block diagram of the imaging system of FIG. 1 additionally including an analog-to-digital converter.

In the embodiment depicted in FIG. 5, each pixel 190 includes a capacitor 115 for integrating photo charge to produce a voltage, a comparator 125 which detects when the voltage exceeds a reference voltage, a charge removal circuit 135 which removes a predetermined fixed amount of charge from the capacitor 115, and a digital counter 145 that increments each time an amount of charge is removed from the capacitor 115. Reset logic 140 supplies a clock-type signal to the charge removal circuit 135, triggering the charge removal circuit to remove the predetermined amount of charge from the capacitor 115 responsive to a signal from the comparator 125 indicating that the voltage across the capacitors has exceeded the reference voltage. With each charge removal/reset event, the digital counter 145 is incremented. The value of the digital counter 145 may be read out via a tri-state gate 150 on a data-out line 180. Multiple other means of conveying the value of digital counter 145 to a set of outputs exist as alternatives to tri-state gate 150 (e.g., the values may be shifted out).

In the array 195, the size of the capacitor may be a relatively small value (e.g., 1 femtofarads or 10 femtofarads) and the number of counter bits may be some number of bits that results in a large range of count values (e.g., 16 bits). Correspondingly, the voltage range of the capacitor 115 may be relatively small (e.g., 250 millivolts). In this configuration, the digital counter 145 may act as an analog-to-digital converter (ADC). The charge removal from the capacitor 115 may be reset back to a first voltage using a simple device such as a MOSFET. The charge removal may also be a more complex circuit that removes a quantum of charge causing the capacitor voltage to go from one value to a second value.

The above described digital formatter may additionally utilize the digital binary value from at least one of the plurality of analog-to-digital converters in the conversion to the pixel value of (1) the digital counter value 252 from the at least one of the plurality of digital counters and (2) the value of associated overflow counters.

A buffer 345 may be coupled between the column readout line 335 and the ADC 340. The voltage transfer may be replaced with charge transfer and such translation does not materially affect the overall function or operation of the present invention.

As discussed above, the pixels in the analog array 195 may be arranged in columns and rows. In one example, each column of pixels is coupled to a corresponding column-based ADC 340, which digitizes the residual voltage 250. However, it will be understood that different circuit topologies can be used to perform the above-described functions, and further that the ADCs 340 may be time-shared between different columns (e.g., one of the ADCs 340 can be used for multiple different pixel columns or rows). The ADCs 340 may be located on the ROIC.

Turning to FIG. 6, a method 500 is shown for increasing a dynamic range of an image. In process block 502, the digital circuitry 210 stores an overflow counter 145 associated with each of a plurality of digital counters of the imaging system 100. In process block 506, for each of the digital counters 145, bit(s) of the digital counter value 252 are read out as previous values.

In process block 508, after a period of time the bit(s) of each digital counter are read out as current values. In decision block 512, the bit(s) of the digital counter value 252 from a current iteration (i.e., the current value) are compared to a previous iteration (i.e., the previous value). If the value represented by the bit(s) of the digital counter value has decreased between subsequent iterations (i.e., the current value is less than the previous value), then the value 256 of the associated overflow counter is incremented in process block 514. If the value has not decreased between subsequent iterations or after process block 514, a check is performed in decision block 516 to determine if an end of frame has been reached. For example, a check may be performed to determine if a frame read signal has been received or to determine if a timing (e.g., determined by a frame frequency) for outputting a frame has been reached. If yes, then processing continues to block 520. In process block 520, a pixel value is generated and output for each of the pixels 190 to form a frame. For each pixel 190, the pixel value is generated based on both the digital counter value 252 from the digital counter 145 associated with the pixel 190, and the associated overflow counter. If an end of frame has not been reached in decision block 516, then processing returns to process block 508.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A method performed using digital circuitry for increasing a dynamic range of a video frame, the method comprising:

storing an overflow counter associated with each of a plurality of digital counters of an imaging system, wherein each of the digital counters is associated with and in communication with a respective one of pixels of the imaging system, and each of the digital counters is configured to store a digital counter value based on a signal received from the respective one of the pixels;

for each of the plurality of digital counters:
periodically reading at least one bit of the digital counter value over multiple iterations;
comparing the at least one bit of the digital counter value from one iteration of the multiple iterations to a previous iteration of the multiple iterations; and
when a value represented by the at least one bit of the digital counter value has decreased from the previous iteration to the one iteration, incrementing an associated overflow counter of the digital circuitry; and
converting and outputting the digital counter value from at least one of the plurality of digital counters and the associated overflow counter as at least one pixel value of the video frame.

2. The method of claim 1, wherein the at least one bit is less than all bits of the digital counter value.

3. The method of claim 2, wherein the at least one bit is only a most significant bit of the digital counter value.

4. The method of claim 1, further comprising:
for each of the plurality of pixels, storing an electrical charge generated by the pixel in one of a plurality of electrical storage devices associated with the respective pixel;
periodically determining whether a cumulative electrical charge in the respective electrical storage device exceeds a predetermined threshold value; and
in response to determining that the cumulative electrical charge stored in the respective electrical storage device exceeds the predetermined threshold value, reducing the electrical charge stored in the respective electrical storage device by a predetermined charge reduction amount and incrementing one of a plurality of digital counter values stored in the digital counters and associated with the respective pixel.

5. The method of claim 4,
wherein each of the pixels further comprises a photodetector configured to generate the electrical charge in response to light impinging thereon; and
further comprising, based on an intensity of the light impinging upon the photodetector of at least one of the pixels, determining a duration of time of the period at which the digital circuitry reads at least one bit of the digital counter value over multiple iterations.

6. The method of claim 5, wherein the duration of time of the period is determined based on the intensity of the light impinging upon the photodetector of a pixel that is receiving a highest intensity of among light of the pixels.

7. The method of claim 4, further comprising:
periodically converting for each of the plurality of pixels a residual electrical charge in the respective electrical storage device of each of the plurality of pixels into an analog signal; and
converting the analog signal from each pixel into a respective digital binary value using one of a plurality of analog-to-digital converters, each of the plurality of analog-to-digital converters having an input and an output, and each of the plurality of analog-to-digital converters being coupled via its input to the respective electrical storage device of a corresponding one of the plurality of pixels;
wherein the respective digital binary value is additionally used in the conversion of the at least one of the plurality of digital counters and the associated overflow counter into the at least one pixel value of the video frame.

8. Digital circuitry for increasing a dynamic range of a video frame, the digital circuitry configured to:
store an overflow counter associated with each of a plurality of digital counters of an imaging system, wherein each of the digital counters is associated with and in communication with a respective one of pixels of the imaging system, and each of the digital counters is configured to store a digital counter value based on a signal received from the respective one of the pixels; and for each of the plurality of digital counters:
periodically read at least one bit of the digital counter value over multiple iterations;
compare the at least one bit of the digital counter value from one iteration of the multiple iterations to a previous iteration of the multiple iterations; and
when a value represented by the at least one bit of the digital counter value has decreased from the previous iteration to the one iteration, increment an associated overflow counter.

9. The digital circuitry of claim 8, wherein the at least one bit is less than all bits of the digital counter value.

10. The digital circuitry of claim 9, wherein the at least one bit is only a most significant bit of the digital counter value.

11. The digital circuitry of claim 8:
wherein each of the pixels further comprises a photodetector configured to generate the electrical charge in response to light impinging thereon; and
wherein a duration of time of the period at which the digital circuitry reads at least one bit of the digital counter value over multiple iterations is determined based on an intensity of the light impinging upon the photodetector of at least one of the pixels.

12. The digital circuitry of claim 11, wherein the duration of time of the period is determined based on the intensity of the light impinging upon the photodetector of a pixel that is receiving a highest intensity of the light among the pixels.

13. An imaging system comprising:
an array of pixels, each of the pixels including:
an electrical storage device configured to accumulate an electrical charge from photo-current, and
quantization circuitry coupled to the electrical storage device and configured to convert the electrical charge into an analog quantization event signal;
a plurality of digital counters corresponding to the array of pixels, each of the digital counters being associated with and in communication with a respective one of the pixels, and each of the digital counters is configured to store a digital counter value in response to receiving the analog quantization event signal from the respective one of the pixel; and
digital circuitry storing an overflow counter associated with each of the plurality of digital counters, and configured to, for each of the plurality of digital counters:
periodically read at least one bit of the digital counter value over multiple iterations;
compare the at least one bit of the digital counter value from one iteration of the multiple iterations to a previous iteration of the multiple iterations; and
when a value represented by the at least one bit of the digital counter value has decreased from the previous iteration to the one iteration, increment an associated overflow counter.

14. The imaging system of claim 13, wherein the at least one bit is less than all bits of the digital counter value.

15. The imaging system of claim 14, wherein the at least one bit is only a most significant bit of the digital counter value.

16. The imaging system of claim 13,
wherein each of the pixels further comprises a photodetector configured to generate the photo-current in response to light impinging thereon; and
wherein a duration of time of the period at which the digital circuitry reads at least one bit of the digital counter value over multiple iterations is determined based on an intensity of the light impinging upon the photodetector of at least one of the pixels.

17. The imaging system of claim 16, wherein the duration of time of the period is determined based on the intensity of the light impinging upon the photodetector of a pixel that is receiving a highest intensity of the light among the pixels.

18. The imaging system of claim 13, further comprising a digital formatter configured to convert the digital counter value from at least one of the plurality of digital counters and the associated overflow counter into at least one pixel value of a video frame.

19. The imaging system of claim 13,
further comprising a plurality of analog-to-digital converters, each of the plurality of analog-to-digital converters having an input and an output; and
wherein each of the plurality of analog-to-digital converters is coupled via its input to the electrical storage device of at least one of the pixels and configured to convert a residual electrical charge in the respective electrical storage device into a digital binary value; and
wherein the digital formatter additionally utilizes the digital binary value from at least one of the plurality of analog-to-digital converters in the conversion of the digital counter value from the at least one of the plurality of digital counters and the associated overflow counter into the at least one pixel value of the video frame.

20. The imaging system of claim 13,
wherein each of the pixels further comprises a photodetector configured to generate the photo-current in response to light impinging thereon; and
wherein the digital counter value corresponds to an intensity of the light impinging upon the photodetector of the respective one of the pixels.

* * * * *